US012750315B2

(12) United States Patent
Vavilala et al.

(10) Patent No.: US 12,750,315 B2
(45) Date of Patent: Sep. 29, 2026

(54) SPI DIFFERENTIATED THIN PIPES BETWEEN ENDPOINTS WITH CORE BALANCING BASED ON SPI SELECTION

(71) Applicant: Palo Alto Networks, Inc., Santa Clara, CA (US)

(72) Inventors: Krishna Kumar Vavilala, Bangalore (IN); Suresh Basavanagouda Patil, Hubli (IN); Naga Raghu Ramprasad Nandigama, Bangalore (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 25 days.

(21) Appl. No.: 18/981,340

(22) Filed: Dec. 13, 2024

(65) Prior Publication Data

US 2026/0172358 A1 Jun. 18, 2026

(51) Int. Cl.

*H04L 47/125* (2022.01)
*H04L 9/40* (2022.01)
*H04L 12/46* (2006.01)

(52) U.S. Cl.

CPC ........ *H04L 47/125* (2013.01); *H04L 12/4641* (2013.01); *H04L 63/20* (2013.01)

(58) Field of Classification Search

CPC .... H04L 47/125; H04L 12/4641; H04L 63/20
See application file for complete search history.

(56) References Cited

U.S. PATENT DOCUMENTS 8,909,766 B1 * 12/2014 Hegg .................. H04L 43/0811 709/224
10,721,097 B2 7/2020 Nandoori et al.
2012/0078998 A1 * 3/2012 Son ..................... H04L 61/4511 709/203
2016/0212098 A1 * 7/2016 Roch ..................... H04L 63/029
(Continued)

OTHER PUBLICATIONS

Eraltan, "Single IPsec Tunnel—How to get Higher Bandwidth", 6WIND [online], [retrieved on Nov. 5, 2024] Retrieved from the Internet: <https://www.6wind.com/single-ipsec-tunnel-how-to-get-higher-bandwidth/>, Jun. 1, 2021, 8 pages.
(Continued)

*Primary Examiner* — Chris Parry
*Assistant Examiner* — Steven C Nguyen
(74) *Attorney, Agent, or Firm* — Gilliam IP PLLC

(57) ABSTRACT

A sub-tunneling technique disclosed herein reserves a range of security parameters index (SPI) values when establishing a secure tunnel connection. At the sending tunnel peer, the network driver of the sending tunnel peer NIC ("sending NIC") maps network traffic flows to different SPI values within the range reserved for the secure tunnel connection. This effectively creates logical sub-tunnels within the secure tunnel connection and allows the sending NIC to distribute network traffic flows across the sub-tunnels. At the receiving tunnel peer, the network driver of its NIC ("receiving NIC") masks lower bits of the SPI values to obtain a base SPI value corresponding to the secure tunnel connection to determine the security association for decrypting packets from the
(Continued)

tunnel. However, the receiving NIC uses the various SPI values of the sub-tunnels to distribute the network traffic flows across the RX queues.

15 Claims, 8 Drawing Sheets

(56) References Cited

U.S. PATENT DOCUMENTS

2023/0076070 A1 * 3/2023 Gupta ................. H04L 63/0272

OTHER PUBLICATIONS

Navratil, et al., "Red Hat Enterprise Linux 6 Performance Tuning Guide", [online], [retrieved on Nov. 6, 2024] Retrieved from the Internet: <https://docs.redhat.com/en/documentation/red_hat_enterprise_linux/6/html/performance_tuning_guide/index#idm140718736841408>, May 19, 2020, 96 pages.

Williams, "IPsec Channels: Connection Latching", [online], [retrieved on Nov. 6, 2024] Retrieved from the Internet: <https://datatracker.ietf.org/doc/html/rfc5660> Oct. 2009, 31 pages.

* cited by examiner

SPI DIFFERENTIATED THIN PIPES BETWEEN ENDPOINTS WITH CORE BALANCING BASED ON SPI SELECTION

BACKGROUND

The disclosure generally relates to network communication protocols and throughput (e.g., CPC subclass H04L 63 and CPC subclass H04L 47).

A network interface card (NIC) with multi-queue receive/receive side scaling (RSS) enabled will have multiple processing units (e.g., cores) and a receive (RX) queue for each processing unit of the NIC. A NIC with RSS capability can support a higher throughput of packets by distributing traffic loads across the processing units. Distribution of traffic is according to RSS configuration including hash inputs (e.g., source and destination network addresses), hash algorithm, and quantity of processing units (or quantity of RX queues). For each received packet, a driver of the NIC will compute a hash value according to the RSS configuration and map the hash value to a RX queue and enqueue the packet accordingly. Each processing unit will poll its RX queue.

Virtual Private Networks (VPNs) can be categorized into site-to-site (or gateway-to-gateway) VPNs, remote access (or host-to-gateway) VPNs, cloud VPNs, and secure sockets layer (SSL) VPNs. Forming a VPN involves creating a connection with a tunnel between tunnel endpoints/peers according to a protocol(s). A tunnel can be created according to the IPsec (Internet Protocol Security) suite of protocols or L2TP (Layer 2 Tunneling Protocol).

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope.

Well-known instruction instances, protocols, structures, and techniques have not been shown in detail for conciseness.

Overview

While VPN tunnels (e.g., IPsec tunnels) provide secure communications, the variation in network addresses across network traffic flows is lost within the tunnel encapsulation. A receiving tunnel peer with a RSS enabled NIC will no longer load balance network traffic flows across processing units because the hash value for mapping a packet to an entry will be from the tunnel header which will be the same for all of the traffic transmitted via the tunnel. Thus, the tunnel security impairs throughput.

A sub-tunneling technique has been created that allows secure connections with VPN tunnels without impairing load balancing capabilities at a receiving tunnel peer. The sub-tunneling technique disclosed herein reserves a range of security parameters index (SPI) values when establishing a secure tunnel connection. At the sending tunnel peer, the network driver of the sending tunnel peer NIC ("sending NIC") maps network traffic flows to different SPI values within the range reserved for the secure tunnel connection. This effectively creates logical sub-tunnels within the secure tunnel connection and allows the sending NIC to distribute network traffic flows across the sub-tunnels. At the receiving tunnel peer, the network driver of its NIC ("receiving NIC") masks lower bits of the SPI values to obtain a base SPI value corresponding to the secure tunnel connection to determine the security association for decrypting packets from the tunnel. However, the receiving NIC uses the various SPI values of the sub-tunnels to distribute the network traffic flows across the RX queues.

Example Illustrations

Figure 1:
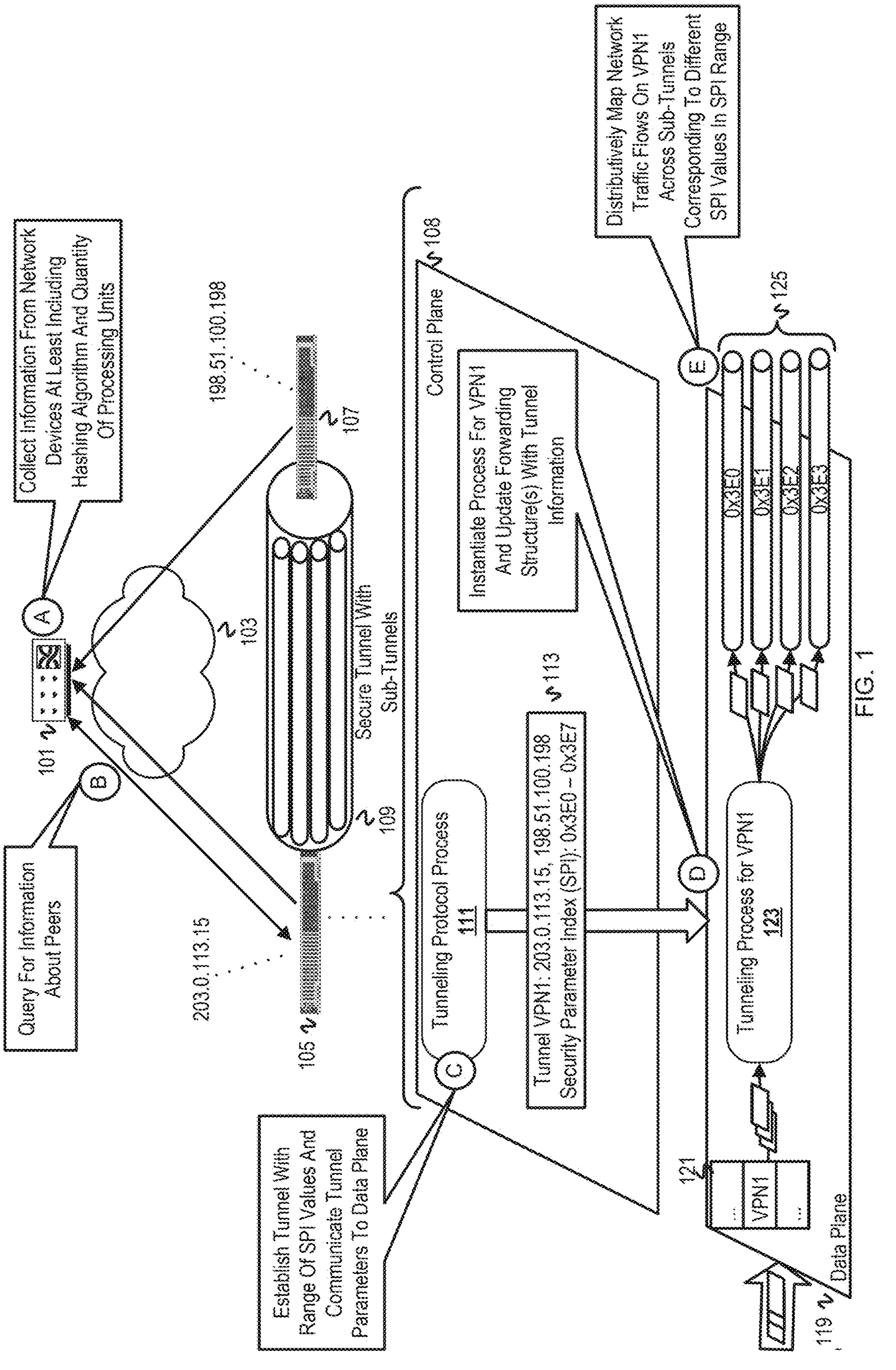
FIG. 1 depicts traffic processing in a data plane of a sending tunnel peer for sub-tunnel transmission.
Figure 2:
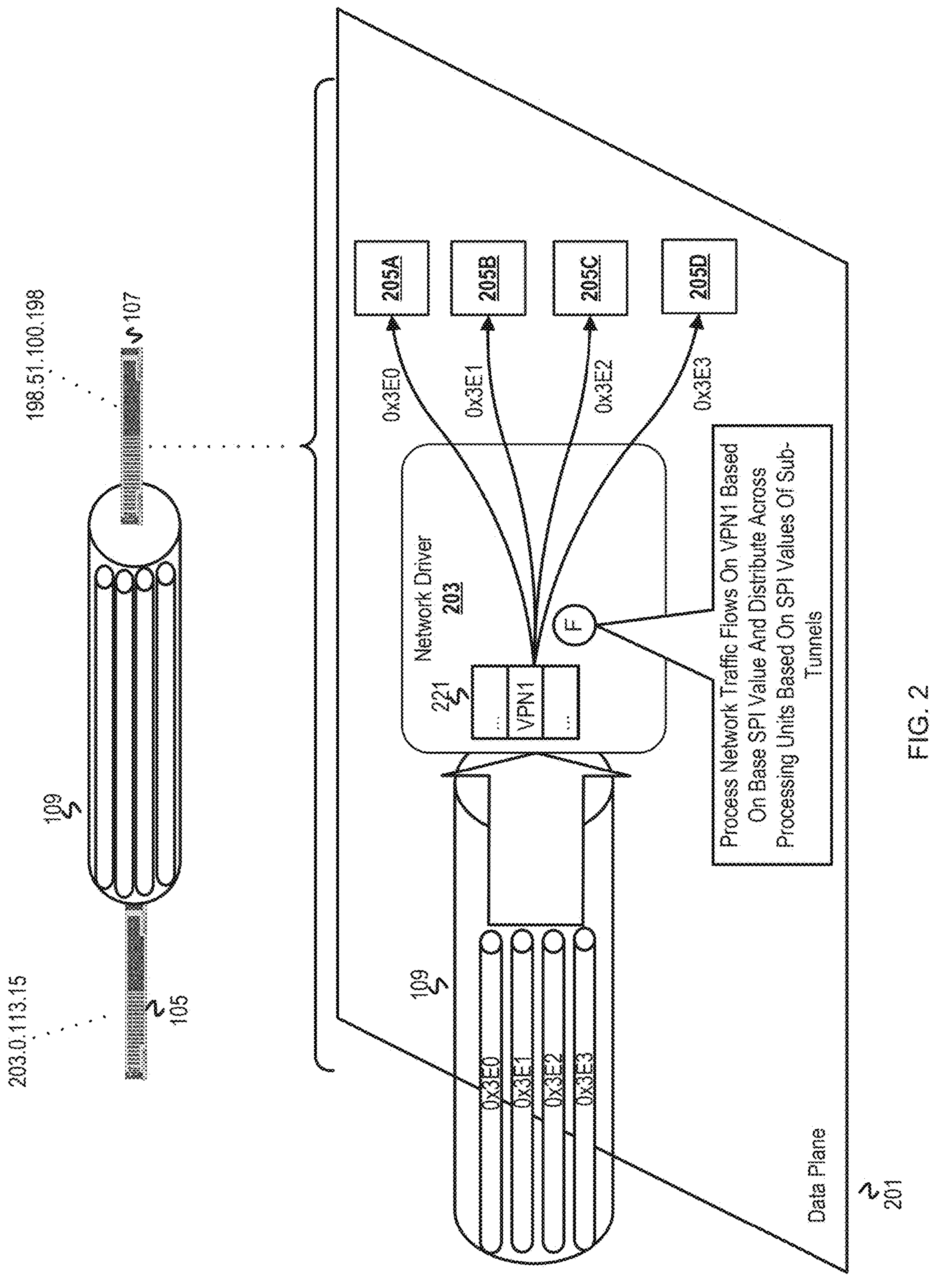
FIG. 2 depicts a data plane of a receiving tunnel peer distributing network traffic received via the sub-tunnels of the secure tunnel connection.

FIGS. 1-2 are diagrams of transmitting network traffic via sub-tunnels of a secure tunnel connection between tunnel peers. FIG. 1 depicts traffic processing in a data plane of a sending tunnel peer for sub-tunnel transmission. FIG. 2 depicts a data plane of a receiving tunnel peer distributing network traffic received via the sub-tunnels of the secure tunnel connection. FIGS. 1 and 2 depict a secure tunnel connection 109 between a first network device 105 that is a sending tunnel peer (e.g., gateway) in this illustration and a second network device 107 that is a receiving tunnel peer in this illustration. The network device 105 is depicted with a control plane 108 and a data plane 119.

FIGS. 1-2 are annotated with a series of letters A-F, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, a SD-WAN (Software Defined Wide Area Network) controller 101 collects information from network devices via a network 103. While a SD-WAN controller likely communicates with numerous network devices of an organization, FIG. 1 only depicts the SD-WAN controller 101 interacting with the network devices 105, 107 to focus on a single tunnel connection. The SD-WAN controller 101 at least collects, for this illustration, network addresses and configuration information that includes hashing algorithm(s) and quantity of processing units. The network device 105 has a network address 203.0.113.15 and the network device 107 has a network address 198.51.100.198.

At stage B, the network device 105 queries the SD-WAN controller 101 for information about peers. The network device 105 obtains this information about peers for potential tunnel connections. Implementations may instead push this information from the SD-WAN controller 101 to network devices managed by the SD-WAN controller 101, and periodically refresh the information.

At stage C, a tunneling protocol process 111 in the control plane 108 of the network device 105 establishes the secure tunnel connection 109 with the network device 107. The tunneling protocol process 111 obtains a range of SPI values and uses the base or beginning of the range in the key negotiation with the network device 107 as part of the combination (i.e., destination address and security protocol) that identifies the security association (SA) for the tunnel connection 109. Configuration information 113 that identifies the tunnel endpoints for the tunnel connection 109 with a tunnel label "VPN1" is created in the control plane 108. In this example, the range of SPI values are 0x3E0 to 0x3E7, with SPI value 0x3E0 being the base SPI value that is part of the combination that identifies the SA for the secure tunnel connection 109. The tunneling protocol process 111 communicates to the data plane 119 the tunnel configuration 113 along with selector fields for identifying the network traffic flows to be communicated via the secure tunnel connection 109. While the base SPI is used for establishing the secure tunnel connection 109, the values within the reserved range of SPI values will be used to differentiate sub-tunnels.

At stage D, the data plane 119 instantiates a tunneling process 123 for VPN1 and updates a forwarding structure(s) in the data plane 119 with the tunneling configuration 113. For instance, the data plane 119 updates a security policy database (SPD) with the tunneling configuration 113 and corresponding selector fields. Updating the forwarding structures includes updating an interface table 121 with the VPN1 label. In addition, a network driver, for example, of the data plane 119 instantiates the tunneling process 123 to maintain traffic statistics for the secure tunnel connection 109 and states for each of sub-tunnels 125 of the secure tunnel connection 109.

At stage E, the tunneling process 123 (or another process of the data plane 119) distributes network traffic flows received via the VPN1 interface across sub-tunnels 125. The tunneling process 123 distributively maps network traffic flows to different ones of the SPI values in the range of SPI values allocated for the secure tunnel connection 109. For example, the tunneling process 123 computes a hash value from flow identifiers and maps the hash value to one of the sub-tunnels. FIG. 1 only illustrates 4 sub-tunnels 125 corresponding to the SPI values 0x3E0 to 0x3E3 due to space constraints and to avoid unnecessarily complicating the description. The SPI values effectively operate as tags to distinguish the sub-tunnels despite the user and control perspective that there is only the secure tunnel connection 109.

At stage F in FIG. 2, a data plane 201 of the network device 107 processes network traffic flows based on SPI value of the allocated range and distributes the network traffic across processing units based on SPI values of the sub-tunnels. The data plane 201 includes processing units 205A-205D and load balances network traffic received over the sub-tunnels 125 according to RSS across the processing units 205A 205D. A network driver 203 receives network traffic on the VPN1 interface associated with the secure tunnel connection 109 in an interface table 221. The network driver 203 masks the SPI values read from the Encapsulating Security Payload (ESP) header of each datagram/packet to determine the SA for further processing (e.g., decapsulating and decrypting) the packet. After the processing, the network driver 203 uses the unmasked SPI values to map the network traffic to RX queues of the processing unit 205A-205D. The mapping will be discussed in more detail in the flowcharts.

While sub-tunneling is an effective approach for maintaining throughput while securing traffic in VPN tunnels, embodiments can use another multiple connection technique. Embodiments can use secondary network addresses to establish multiple VPN tunnels between the same tunnel endpoints or same NICs of tunnel peers. An organization can obtain a primary network addresses and multiple secondary addresses for each gateway or edge device.

Figure 3:
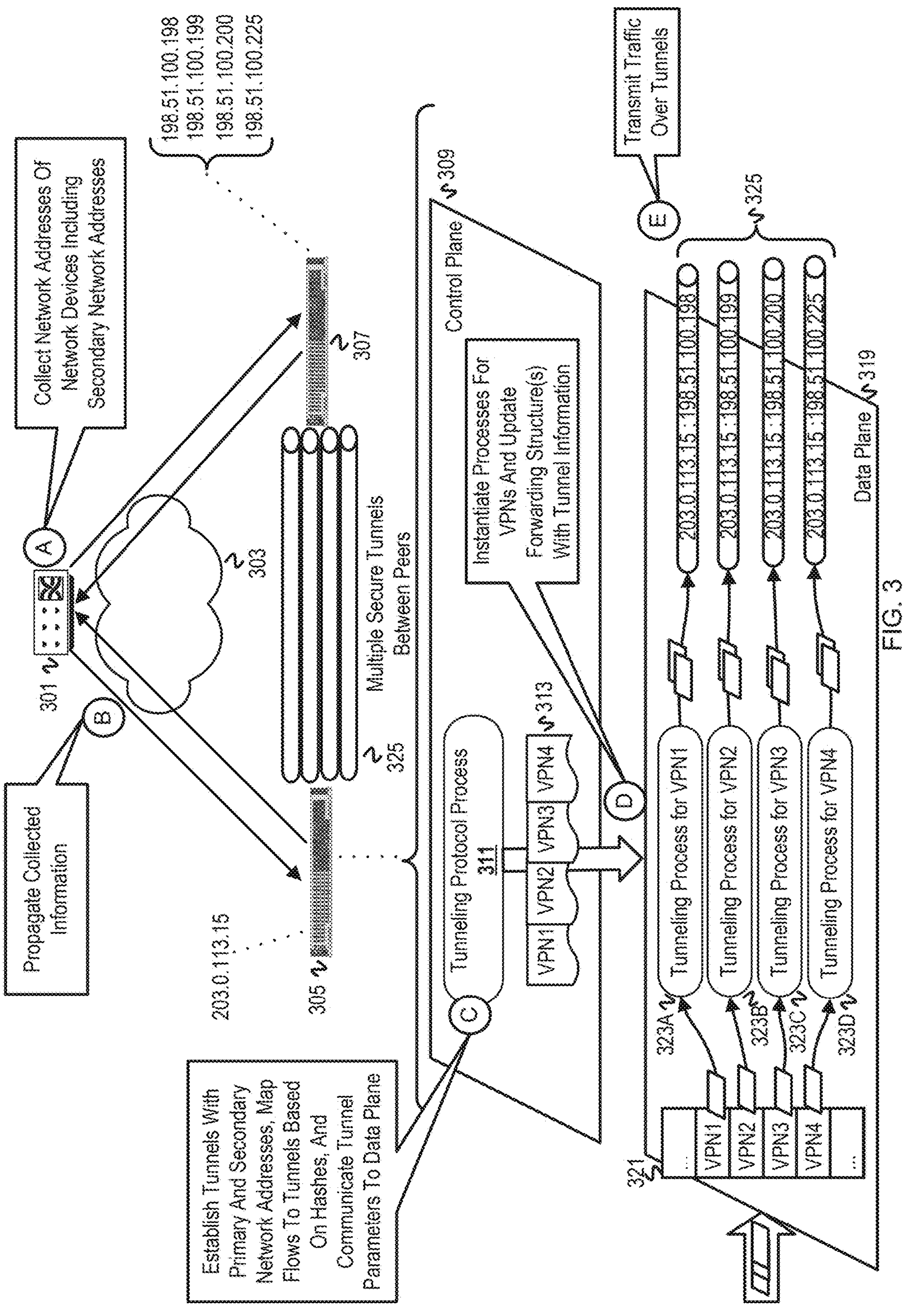
FIGS. 3-4 are diagrams depicting another tunneling technique that leverages secondary network addresses to load balance network traffic across processing units.
Figure 4:
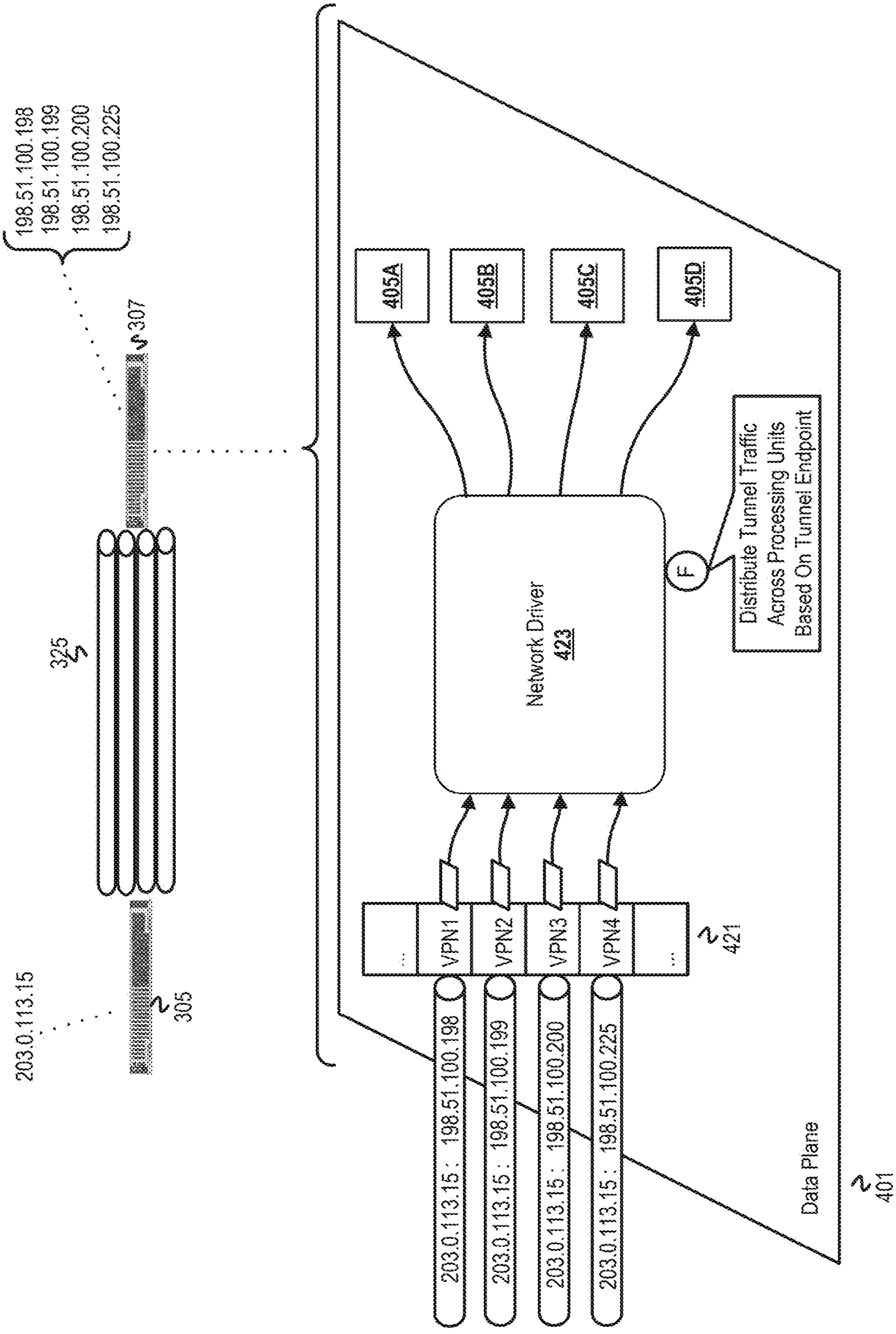

FIGS. 3-4 are diagrams depicting another tunneling technique that leverages secondary network addresses to load balance network traffic across processing units. Instead of distinguishing sub-tunnels with SPI values, multiple tunnels are created between the same tunnel endpoints using secondary network addresses assigned to the tunnel endpoint that is the receiving tunnel peer. FIGS. 3 and 4 depict multiple secure tunnels 325 between a first network device 305 that is a sending tunnel peer in this illustration and a second network device 307 that is a receiving tunnel peer in this illustration. The network device 305 is depicted with a control plane 309 and a data plane 319.

FIGS. 3-4 are annotated with a series of letters A-F, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, a SD-WAN controller 301 collects information from network devices via a network 303. The SD-WAN controller 301 collects, for this illustration, network addresses of network devices at least including secondary network addresses. The network device 305 has a network address 203.0.113.15, and the network device 307 has network addresses 198.51.100.198, 198.51.100.199, 198.51.100.200, and 198.51.100.225.

At stage B, the SD-WAN controller 301 propagates the collected information to the network devices managed by the SD-WAN controller 301, including the network devices 305, 307. This provides visibility of potential tunnel peers to the devices of an organization's network.

At stage C, a tunneling protocol process 311 establishes tunnels 325 to the network device 307 with the network addresses of the network device 307. In a control plane 309 of the network device 305, the tunneling protocol process 311 will establish the tunnels 325 in response to a request to establish a VPN tunnel between the network devices 305, 307 or sites of the network devices 305, 307. The establishment of the multiple tunnels 325 can be "behind-the-scenes" with respect to VPN tunnel setup to avoid overwhelming a user with the information that multiple tunnels are being established between the same tunnel endpoints. For instance, an interface for setting up or requesting a VPN tunnel would only indicate the primary network addresses of the network devices 305, 307 suggesting a single tunnel connection. The tunneling protocol process 311 generates tunnel configurations 313 for VPN1, VPN2, VPN3, and VPN4. To distribute network flows across the tunnels 325, the tunneling protocol process 311 maps network flows across the tunnels 325 by flow identifier. For example, the tunneling protocol process 311 can compute hashes of flow identifiers (i.e., source and destination network addresses) and select from m tunnels based on the lowest n bits ($n=\log_2 m+1$) of the hash value of the flow identifier. The mapping of flow identifiers to tunnels will be indicated in selector fields. The tunneling protocol process 311 then communicates to the data plane 319 the tunnel configurations 313. While FIG. 3 illustrates the mapping being performed in the control plane 309 and plumbed or pushed to the data plane 319, embodiments can perform the mapping in a data plane. Underlying hardware can support the capability for logic or program code to be loaded into a data plane to autonomously map flows to tunnels in a distributive manner when tunnel peers have multiple tunnels therebetween. Or a data plane can be loaded with logic/program code that maps flows to an interface and has other processes distribute flows of that interface across tunnels bound to that interface.

At stage D, the data plane 319 instantiates tunneling processes 323A-323D for VPN1, VPN2, VPN3, and VPN4, respectively. The data plane 319 also updates a forwarding structure(s) in the data plane 319 based on the tunneling configurations 313. For instance, the data plane 319 updates a SPD with the tunneling configurations 313 and corresponding selector fields. Updating the forwarding structures includes updating an interface table 321 with the VPN1, VPN2, VPN4, and VPN4 labels. In addition, a network driver of the data plane 319, for example, instantiates the tunneling processes 323A-323D to maintain traffic statistics and states for the tunnels 325.

At stage E, the tunneling processes 323A-323D (or another process of the data plane 319) transmits network traffic flows received via the VPN1, VPN2, VPN3, and VPN4 interfaces over their corresponding ones of the tunnels 325. Traffic received on interface VPN1 is sent via the tunnel with network addresses 203.0.113.15 and 198.51.100.198. Traffic received on interface VPN2 is sent via the tunnel with network addresses 203.0.113.15 and 198.51.100.199. Traffic received on interface VPN3 is sent via the tunnel with network addresses 203.0.113.15 and 198.51.100.200. Traffic received on interface VPN4 is sent via the tunnel with network addresses 203.0.113.15 and 198.51.100.225.

At stage F in FIG. 4, a data plane 401 of the network device 307 processes network traffic flows from the tunnels 325. The data plane 401 includes processing units 405A-405D. A network driver 423 receives network traffic on the VPN1, VPN2, VPN3, and VPN4 interfaces corresponding to the tunnels 325 and indicated in an interface table 421. The network driver 423 extracts outer network addresses from tunnel headers and computes hash values that map to RX queues of the processing units 405A 405D.

Figure 5:
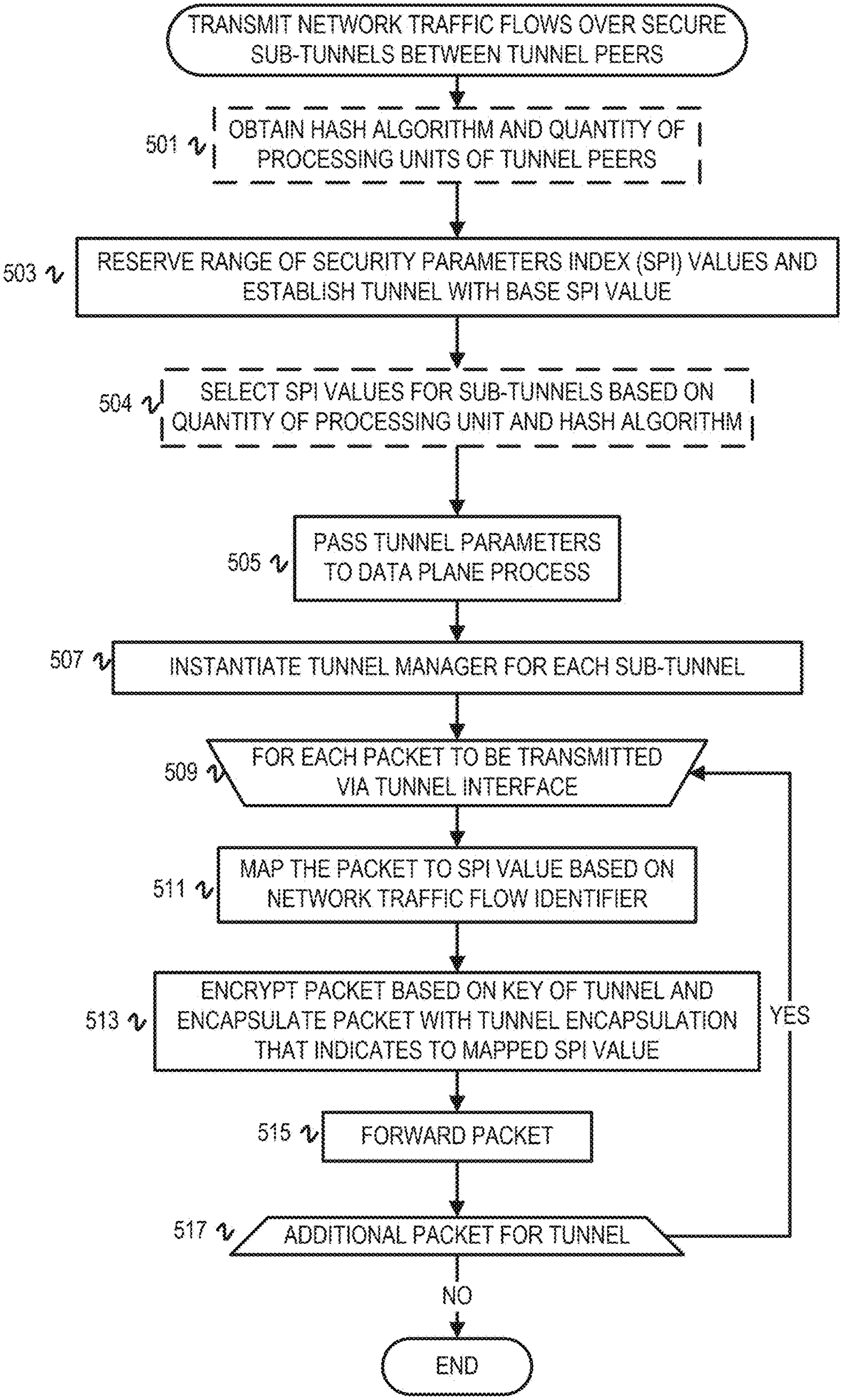
FIG. 5 is a flowchart of example operations for transmitting network traffic flows over secure sub-tunnels between tunnel peers.
Figure 6:
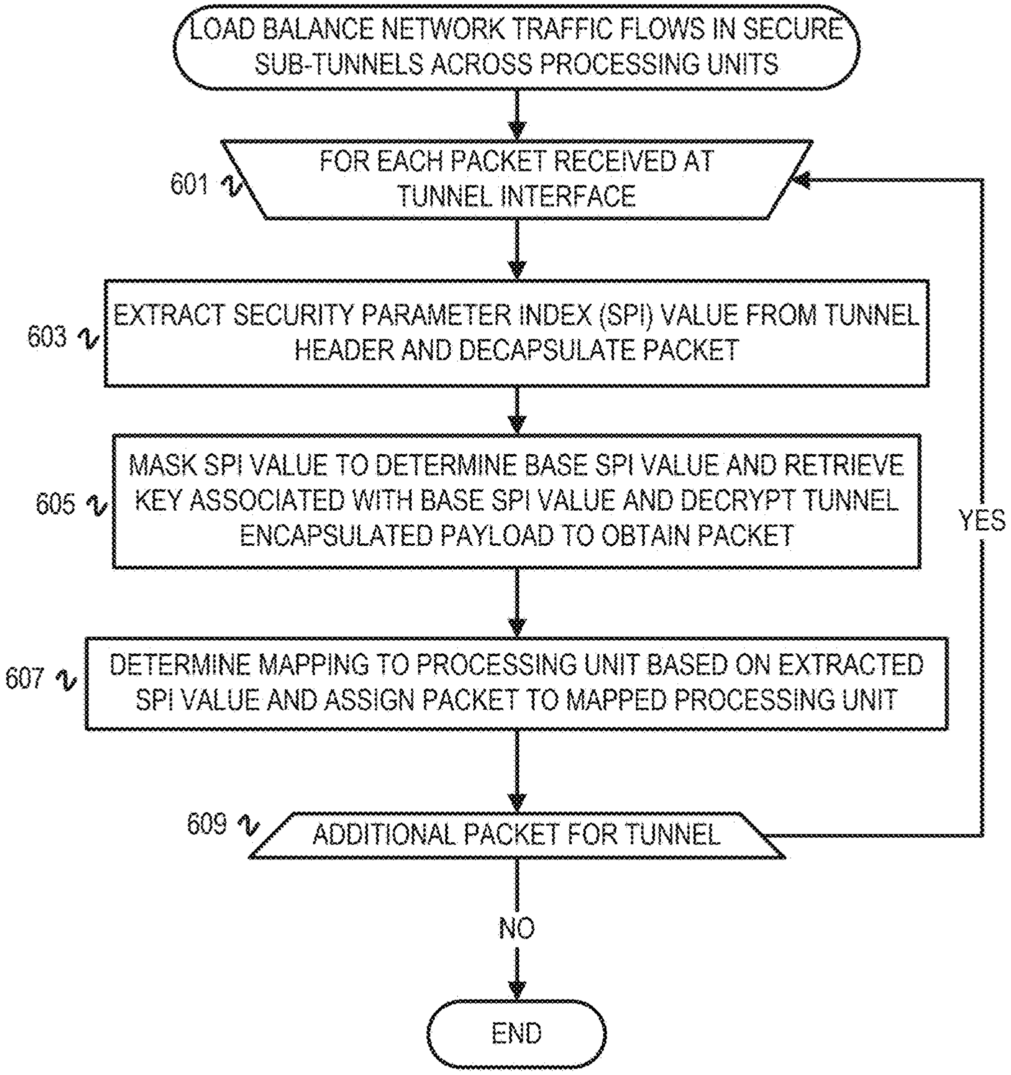
FIG. 6 is a flowchart of example operations for load balancing network traffic flows in secure sub-tunnels across processing units at a receiving tunnel peer.

FIGS. 5-6 are flowcharts of example operations corresponding to the sub-tunnel technique for transmitting network traffic flows. FIG. 5 corresponds to a sending tunnel peer, and FIG. 6 corresponds to a receiving tunnel peer. The example operations are described with reference to processes in the control plane and data plane for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. An example operation depicted in a dashed line indicates that the operation is optional in the flowchart.

FIG. 5 is a flowchart of example operations for transmitting network traffic flows over secure sub-tunnels between tunnel peers. In addition to the sub-tunneling, the example operations include operations for influencing SPI value selection based on the configuration of a receiving tunnel peer.

At block 501, a control plane process obtains information that indicates a hash algorithm and quantity of processing units of tunnel peers. The control plane process can cache the information that a SD-WAN controller collects from devices of an organization's network or query the SD-WAN controller.

At block 503, the control plane process reserves a range of SPI values for a tunnel connection and establishes the tunnel with a base value of the SPI values. The control plane process reserves the range of SPI values based on the quantity of processing units (p) of the tunnel peer. As a tunnel endpoint will have been identified as part of the tunnel configuration, the control plane process can read the information for the identified tunnel endpoint to determine the value of p and then reserve a sufficient range of SPI values. For example, the control plane process can reserve a range of at least a same quantity of SPI values as p (e.g., a range of 300-315 for 16 processing units). To establish the tunnel, the control plane process selects the base SPI value of the range. Using the 300-315 range of SPI values as a reference, the control plane process would communicate the SPI value 300 for establishing the tunnel.

At block 504, the control plane process selects SPI values for sub-tunnels based on p and the hashing algorithm. With the hashing algorithm and p, the control plane process can select SPI values to avoid collisions in the mapping values at the receive side or at least have a low likelihood of collisions. Typically, the receive side will compute a hash value from a tuple of a packet, such as the source IP address, destination IP address, and ports. A set of lowest significant bits (LSBs) of the hash value are used to map to one of the RX queues. If there are n queues, then the $\log_2(n)$ LSBs of the hash value are used to select a RX queue. For sub-tunnels, the receive side will include the SPI value within the input to the hashing algorithm. For instance, the receiving tunnel peer will compute a hash from the tunnel addresses (i.e., the outer source IP address and the outer destination IP address) and the SPI value. With the previously collected information including the hashing algorithm, the control plane process can determine whether the LSBs of the hash values of the outer network addresses and SPI values will collide and then select different SPI values within the range. Accordingly, the control plane process would reserve a larger range of SPI values than p (at block 503) to allow evaluation of different SPI values.

At block 505, the control plane process passes the tunnel parameters to a data plane process. For instance, the control plane process communicates to a data plane process via a north-south interface between the planes. The tunnel parameters would include parameters for updating a SPD and the selected SPI values.

At block 507, the data plane process instantiates a tunnel manager for each sub-tunnel. Each sub-tunnel is a logical pipe within the established tunnel and designated by a corresponding one of the selected SPI values in the reserved range. Thus, a tunnel manager is instantiated for each selected SPI value that will be used for load balancing on the receive side. The tunnel manager can be a child process or thread that tracks traffic statistics for a corresponding sub-tunnel.

At block 509, the data plane process begins processing each packet to be transmitted via the tunnel interface. The data plane process is hosted on a NIC of a gateway device that handles network traffic for a local area network (LAN), for example a corporate site. The network traffic will be configured to be transmitted out of the LAN via the tunnel, which is defined as an interface in the data plane. As packets arrive at the queues of the NIC, the network driver will dequeue and process the packet.

At block 511, the data plane process maps the packet to a SPI value/sub-tunnel based on the network traffic flow identifier of the packet. The network traffic flow that includes the packet is identified by, at least, the source and destination addresses in the header of the packet. To map the packet, the data plane process can compute a hash value of the network traffic flow identifier and use the hash value to map to one of the selected SPI values. The data plane process could also select the LSBs of the hash value depending upon the number of sub-tunnels and map to one of the sub-tunnels.

At block 513, the data plane process encrypts the packet based on an encryption key of the tunnel. The data plane process encapsulates the encrypted packet with tunnel encapsulation that includes a tunnel header indicating the mapped SPI value.

At block 515, the network driver forwards the packet. For instance, the network driver enqueues the packet into a transmit queue.

At block 517, the network driver determines whether there is an additional packet to transmit via the tunnel. If there is another packet, then operational flow returns to block 509. Otherwise, the operational flow ends. The operational flow likely does not end until network traffic is no longer received on the tunnel interface, which likely coincides with disconnection or tunnel tear down.

FIG. 6 is a flowchart of example operations for load balancing network traffic flows in secure sub-tunnels across processing units at a receiving tunnel peer. For the receiving tunnel peer, the operations that occur in the data plane are relevant. The example operations refer to a data plane process, which is the data plane process of the receiving tunnel peer.

At block 601, the data plane process selects a packet to process based on the operations depicted in blocks 601, 603, 605, 607. Presumably, packets are received continuously while a tunnel is up. The tunnel will be associated with a tunnel interface indicated in an interface table in the data plane. The data plane process will select a packet from one or more receive queues of the tunnel interface.

At block 603, the data plane process extracts an SPI value from the tunnel header of the packet. After extracting information from the tunnel header, the data plane process decapsulates the selected packet.

At block 605, the data plane process masks the SPI value to determine the base SPI value. The mask is based on a configuration of the receiving tunnel peer. For instance, the receiving tunnel peer may define an 8 bit mask based on number of processing units and that information is shared with peers via the SD-WAN controller. With the base SPI value, the data plane process retrieves a key associated with base SPI value and decrypts the tunnel encapsulated payload to obtain an inner packet.

At block 607, the data plane process determines a mapping to a processing unit based on the extracted SPI value. The data plane process computes a hash value from the outer network addresses and the SPI value. The data plane process then selects the $\log_2(n)$ LSBs of the hash value to map to a RX queue of one of the n processing units.

At block 609, the data plane process determines whether there is another packet to process for the tunnel interface. For instance, the data plane process dequeues another packet from a tunnel interface RX queue. Operations return to block 601 unless traffic on the tunnel has discontinued and the process ends.

Figure 7:
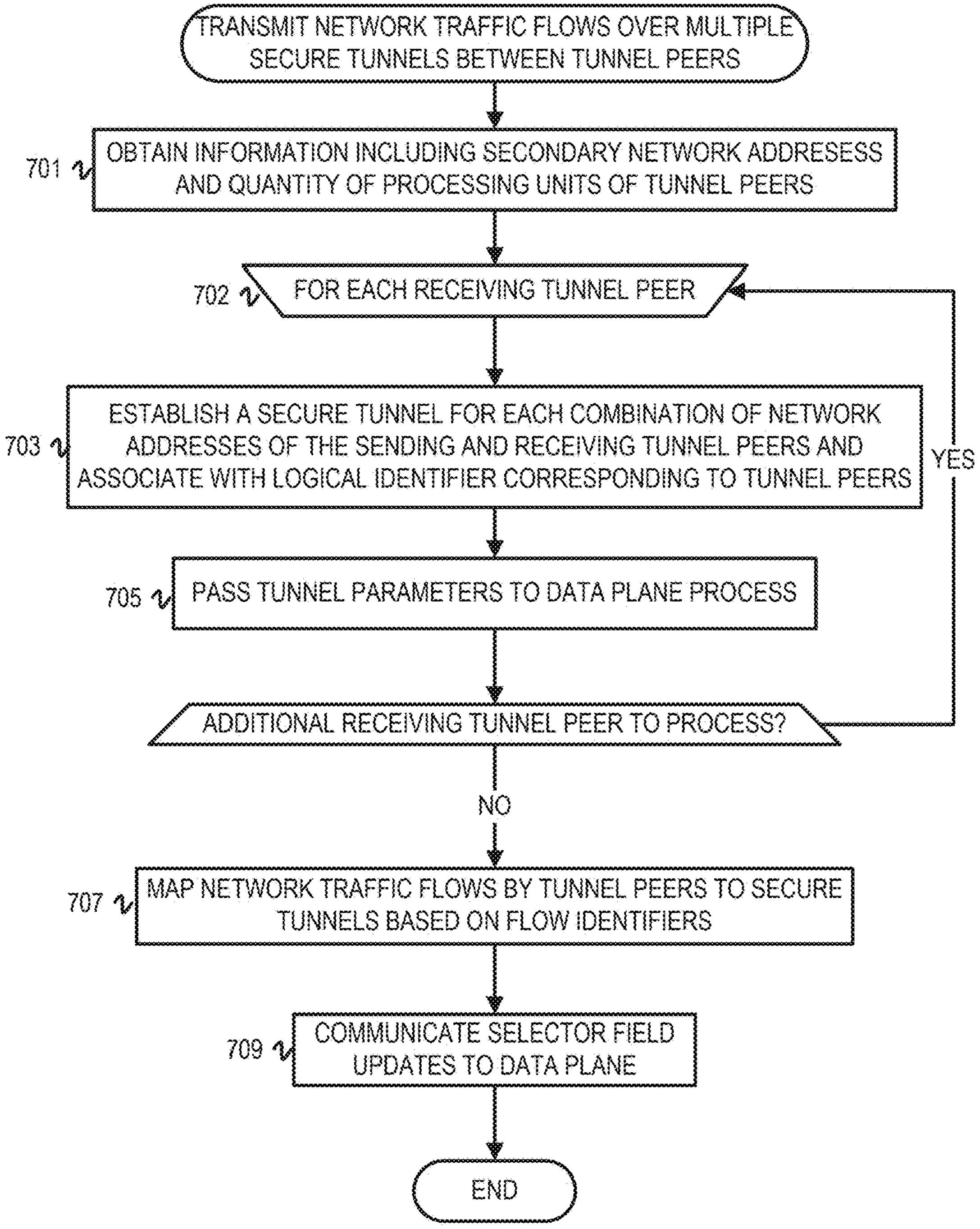
FIG. 7 is a flowchart of example operations for transmitting network traffic flows over multiple secure tunnels between tunnel peers.

As previously indicated, creating thin pipes to influence load balancing at a receiving tunnel peer is not limited to SPI-based sub-tunnels. Embodiments can instead create multiple thin pipes with secondary network addresses. FIG. 7 is a flowchart of example operations for transmitting network traffic flows over multiple secure tunnels between tunnel peers.

At block 701, a control plane process obtains information that at least indicates secondary network addresses (as well as primary network addresses) and quantity of processing units of tunnel peers. The control plane process can cache the information that a SD-WAN controller collects from devices of an organization's network or query the SD-WAN controller.

At block 702, the control plane process begins creating secure tunnels between the sending tunnel peer and each receiving tunnel peer. An administrator or administrative process will indicate each peer with which secure tunnels should be established. For instance, a process can iterate through a list of edge devices or sites and edge devices of each site.

At block 703, the control plane process establishes a secure tunnel for each combination of network addresses of the sending and receiving tunnel peers. If the sending tunnel peer has 2 secondary network addresses and the receiving tunnel peer has 3 secondary network addresses, then the 8 secure tunnels can be established between the tunnel peers. Each of the secure tunnels will have its own handshake/negotiation and have a different SA. To distinguish the collection of secure tunnels from other collections of secure tunnels, the control process can assign a logical identifier (e.g., the primary network addresses of the tunnel peers) to the collection of secure tunnels between the tunnel peers. Each established tunnel will have its own set of tunnel parameters.

At block 705, the control plane process passes the tunnel parameters to a data plane process. For instance, the control plane process communicates to a data plane process via a north-south interface between the planes. The tunnel parameters would include parameters for updating a SPD.

At block 707, the control plane process maps network traffic flows by tunnel peers to secure tunnels based on flow identifiers. After the tunnels are established, the control plane process will begin mapping incoming network traffic flows that correspond to the tunnel peers to one of the secure tunnels. For instance, the control plane process can determine which tunnel peer or logical identifier of tunnel peers is relevant based on destination network address of a packet or combination of source and destination network addresses in a packet. For instance, a subnet of a destination IP address can map to the primary IP address of the receiving tunnel peer. After determining the relevant pair of tunnel peers or receiving tunnel peer, the control plane process can select one of the collection of secure tunnels established to the receiving tunnel peer based on a hash value of the flow identifier as previously mentioned. The mapping will be used to set selector fields for the selected tunnel.

At block 709, the control plane process communicates selector field updates to the data plane. The control plane process communicates to the data plane the selector fields to assign or associate with the interface of the selected tunnel.

While the flowchart depicted in FIG. 7 ends after block 709 for explanatory purposes, actual execution path likely continues. For instance, tunnel configurations can change due to new tunnel peers, additional secondary network addresses, or removal of secondary network addresses. In addition, the control plane likely continues to detect new traffic flows. Thus, the operations represented by blocks 707, 709 would be ongoing while traffic is received, especially across multiple tunnel peer pairings.

Variations

The data plane will have visibility of state and traffic per sub-tunnel while reporting to the control plane at tunnel granularity. For instance, the failure of a sub-tunnel does not impact state of the encompassing tunnel unless all sub-tunnels have gone down. Likewise, the data plane reports to the control plane that a tunnel is up once the first sub-tunnel is active.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
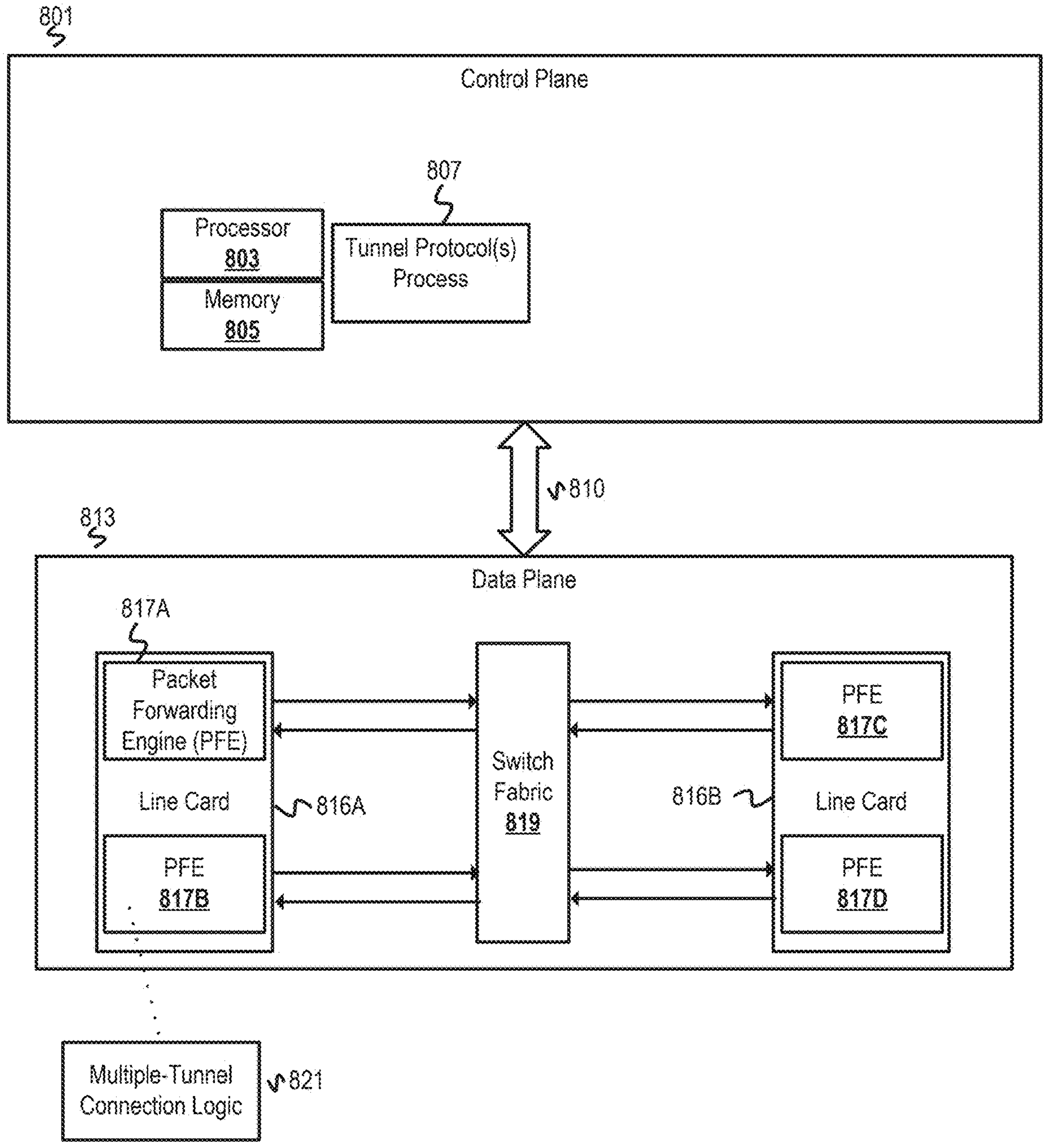
FIG. 8 depicts an example computer system with a control plane and a data plane that includes multiple-tunnel connection logic.

FIG. 8 depicts an example computer system with a control plane and a data plane that includes multiple-tunnel connection logic. The computer system includes a control plane 801 and a data plane 813. The control plane 801 includes a processor 803 (possibly including multiple processors, multiple cores, multiple nodes, and/or implementing multi-threading, etc.) and memory 805. The memory 805 may be system memory or any one or more of the above already described possible realizations of machine-readable media. The control plane 801 also includes a tunnel protocol(s) process that implements a secure tunneling protocol, reserves ranges or blocks of SPI values, and can obtain tunnel peer information from a SD-WAN controller. The tunnel protocol process 807 may be program code executable by the processor 803. The tunnel protocol process 807 communicates with the data plane 813 via a communication channel 810, for example a north-south interface. The data plane 813 includes line cards 816A, 816B which communicate via a switch fabric 819. The line card 816A includes packet forwarding engines (PFEs) 817A, 817B. The line card 816B includes PFEs 817C, 817D. FIG. 8 depicts the PFE 817B as hosting a multiple-tunnel connection logic 821. The other PFEs 817A, 817C, 817D likely also host multiple-tunnel connection logic. The multiple tunnel connection logic 821 includes transmission logic that distributes traffic flows to be transmitted via a VPN tunnel across sub-tunnels/thin pipes of the VPN tunnel. As previously discussed, the sub-tunnels of a VPN tunnel are differentiated by SPI values within a range of SPI values reserved for the VPN tunnel. Embodiments may include logic in the tunnel protocol process 807 to select values from a reserved SPI range based on configuration of a receiving tunnel endpoint (i.e., hashing algorithm and quantify of processing units) to facilitate load balancing across processing units of the receiving tunnel endpoint and avoid collisions. The multiple-tunnel connection logic 821 will also include program code to track states and statistics of the sub-tunnels. The multiple-tunnel connection logic 821 also includes receiving logic that masks the SPI values of sub-tunnels to obtain a base SPI value used for processing tunnel encapsulated packets and that distributes the packets across RX queues based on hash values computed from outer network addresses and SPI values.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:

establishing a virtual private network (VPN) tunnel in a control plane of a first tunnel endpoint with a second tunnel endpoint;

determining, by the first tunnel endpoint, a quantity of different processing units and a hashing algorithm of the second tunnel endpoint;

based on the hashing algorithm and the quantity, determining different security parameters index values (SPIs) to avoid collision of hash values;

transmitting, from the first tunnel endpoint at a data plane, a plurality of network traffic flows in sub-tunnels of the VPN tunnel, wherein transmitting the plurality of network traffic flows in the sub-tunnels comprises using the SPIs in tunnel encapsulations to distinguish the sub-tunnels; and distributing, at the second tunnel endpoint, the plurality of network traffic flows across the different processing units based, at least in part, on the different SPIs, wherein the second tunnel endpoint distributing the plurality of network traffic flows across the different processing units comprises hashing the SPIs and distributing the plurality of network traffic flows across the different processing units according to the hash values of the SPIs.

2. The method of claim 1, wherein a first of the SPIs was assigned to the VPN tunnel in the control plane.

3. The method of claim 1, wherein transmitting the plurality of network traffic flows in the sub-tunnels comprises, for each of the plurality of network traffic flows, initially selecting one of the SPIs for the network traffic flow and continuing to use the same SPI for the network traffic flow as initially selected.

4. The method of claim 3, wherein initially selecting, for each of the plurality of network traffic flows, one of the SPIs is according to a round robin algorithm, a load balancing across the sub-tunnels, or an equal cost multipath load sharing across the sub-tunnels.

5. The method of claim 1 further comprising maintaining a tunnel state machine for each of the sub-tunnels, notifying the control plane that the VPN tunnel is up when an initial one of the sub-tunnels is up, and notifying the control plane that the VPN tunnel is down if all of the sub-tunnels are down.

6. The method of claim 1, wherein distributing the plurality of network traffic flows comprises distributing across the different processing units based on hash values of the SPIs.

7. The method of claim 1, wherein the VPN tunnel is a secure, encrypted connection.

8. A non-transitory, machine-readable medium having program code stored therein, the program code comprising:

first instructions to, determine a quantity of a plurality processing units and a hashing algorithm of a peer tunnel endpoint;

based on the hashing algorithm and the quantity, select a plurality of security parameters index values (SPIs) to avoid collision of hash values;

allocate the selected plurality of SPIs for a virtual private network (VPN) tunnel, wherein the plurality of SPIs includes a first SPI assigned to the VPN tunnel;

distributively map the plurality of SPIs to network traffic flows to be transmitted via the VPN; and transmit the network traffic flows according to the SPI mappings; and second instructions to, hash endpoint identifiers and an SPI indicated in a tunnel encapsulation; and distribute the network traffic flows across a plurality of processing units based, at least in part, on the hash values of the SPIs.

9. The non-transitory, machine-readable medium of claim 8, wherein the first instructions to distributively map the plurality of SPIs to network traffic flows further comprise instructions to, for each of the network traffic flows, maintain a SPI mapping for the network traffic flow unless transmission of the network traffic flow fails a performance metric.

10. The non-transitory, machine-readable medium of claim 8, wherein the first instructions to distributively map the plurality of SPIs to network traffic flows comprise the first instructions to distributively map according to a round robin algorithm, load balancing, or equal cost multipath load sharing.

11. The non-transitory, machine-readable medium of claim 8, wherein the first instructions further comprise instructions to maintain a tunnel state machine for each of the SPI mappings, notify a control plane that the VPN tunnel is up when an initial sub-tunnel corresponding to one of the SPI mappings is up, and notify the control plane that the VPN tunnel is down if all sub-tunnels corresponding to the SPI mappings are down.

12. A system comprising:

a first network device comprising data plane programming to, determine a quantity of a plurality processing units and a hashing algorithm of a second network device;

based on the hashing algorithm and the quantity, select a plurality of security parameter index values (SPIs) to avoid collision of hash values;

allocate the selected plurality of SPIs for a virtual private network (VPN) tunnel, wherein the plurality of SPIs includes a first SPI assigned to the VPN tunnel in a control plane of the first network device; and use each of the plurality of SPIs as a sub-tunnel identifier and distributively assign network traffic flows to sub-tunnels for transmission; and transmit packets of the network traffic flows according to the sub-tunnel assignments; and a second network device comprising a plurality of processing units for a data plane and data plane programming to, for each sub-tunnel, hash endpoint identifiers and the sub-tunnel identifier; and distribute across the plurality of processing units based on the hash values;

distribute received packets across the plurality of processing units based, at least in part, on the hash values of the SPIs indicated in tunnel encapsulations of the packets.

13. The system of claim 12, wherein the data plane programming to distributively assign network traffic flows to sub-tunnels for transmission comprises the data plane programming to maintain the SPI assignment for each network traffic flow unless transmission of the network traffic flow fails a performance metric.

14. The system of claim 12, wherein the data plane programming to distributively assign network traffic flows to sub-tunnels for transmission comprises the data plane programming to distributively assign according to a round robin algorithm, load balancing across the sub-tunnels, or equal cost multipath load sharing across the sub-tunnels.

15. The system of claim 12, wherein the data plane programming to further comprises programming to maintain a tunnel state machine for each of the sub-tunnels, notify the control plane that the VPN tunnel is up when an initial sub-tunnel is up, and notify the control plane that the VPN tunnel is down if all sub-tunnels are down.

* * * * *